Dec. 22, 1964   W. C. CHOATE ETAL   3,162,368
SONIC ENERGY TRANSDUCER

Filed July 6, 1961   6 Sheets-Sheet 1

FIG. 1

William Clay Choate
Jerrold D. Atlas      Inventors
James A. Wilson
By Richard L. Cannaday
                      Patent Attorney Dec. 22, 1964   W. C. CHOATE ETAL   3,162,368
SONIC ENERGY TRANSDUCER
Filed July 6, 1961   6 Sheets-Sheet 2

William Clay Choate
Jerrold D. Atlas    Inventors
James A. Wilson
By Richard L. Caraway
   Patent Attorney Dec. 22, 1964 W. C. CHOATE ETAL 3,162,368
SONIC ENERGY TRANSDUCER
Filed July 6, 1961 6 Sheets-Sheet 4

FIG. 4

William Clay Choate
Jerrold D. Atlas     Inventors
James A. Wilson
By *Richard L. Caunaday*
Patent Attorney Dec. 22, 1964   W. C. CHOATE ETAL   3,162,368
SONIC ENERGY TRANSDUCER
Filed July 6, 1961                6 Sheets-Sheet 5

William Clay Choate
Jerrold D. Atlas      Inventors
James A. Wilson
By Richard L. Caumaday
                Patent Attorney

FIG. 8

William Clay Choate
Jerrold D. Atlas
James A. Wilson
Inventors
By Richard T. Connaughey
Patent Attorney United States Patent Office 3,162,368
Patented Dec. 22, 1964

3,162,368
SONIC ENERGY TRANSDUCER
William Clay Choate, Miami Beach, Fla., and Jerrold D.
Atlas, Plainfield, and James A. Wilson, Stanhope, N.J.,
assignors to Esso Research and Engineering Company,
a corporation of Delaware
Filed July 6, 1961, Ser. No. 122,308
8 Claims. (Cl. 239—102)

This invention relates to a transducer apparatus for receiving inputs of relatively low alternating voltage at or above sonic frequencies and relatively low power, and providing outputs of high mechanical displacements. It relates particularly to such a transducer apparatus for the atomization of liquids.

The present application is a continuation-in-part of co-pending application Serial No. 52,819 filed in the United States Patent Office on August 30, 1960.

It is well known in the art that atomization of liquids may be effected through the use of sonic energy. A pertinent reference is the article "Ultrasonic Atomization of Liquids" by J. N. Antonevich appearing at pp. 6–15 of Transactions on Ultrasonics, February 1959, published by the Institute of Radio Engineers. One apparatus which has been used for atomizing liquids is a transducer comprising a piece of ceramic piezo-electric material such as barium titanate bonded on a flat surface to the larger diametral surface of a truncated conical resonator of elastic and electrically conductive material such as aluminum.

When an alternating voltage of relatively high frequency is applied across the ceramic piece, this piece will be cyclically thickened and thinned and will generate alternate compression and rarefaction waves of sonic energy. This energy, which may be characterized by a frequency above the range of normal hearing, will cause a cyclical lengthening and shortening or longitudinal vibration of the metal resonator as it flows thereinto. With decreasing cross sectional area of the cone in the direction away from the ceramic piece, there will be a concentration of energy near the resonator tip and an increasing amplitude of motion. If a drop of liquid such as home heating oil be applied to the resonator tip while the resonator is being vibrated longitudinally, sonic energy will flow into this drop and the drop will be broken up into a fog of fine particles; that is, it will be atomized.

The bond effected between the ceramic piece and the resonator is critical for proper operation of the transducer assembly. According to a frequently employed method of the prior art, the ceramic piece and the conical resonator are joined by a cement such as an epoxy resin which sets by polymerization rather than by solvent evaporation. It has been noticed in a number of cases that while an epoxy resin bond may be initially satisfactory it will deteriorate for energy transmission purposes in the course of use. This deterioration is made evident by a significant degree of heating of the transducer structure in the region of the cemented joint upon application of voltage to the ceramic piece, with decreased vibratory displacement or amplitude of motion of the tip of the resonator.

According to the present invention, it has been found that in a transducer of the general kind so far described energy transmission from the piece of ceramic piezo-electric material to the resonator will be improved appreciably on at least a long term basis if these parts be held in mechanical compression one against the other. This will be true particularly if compressive or clamping force applied to the side of the ceramic piece removed from the working resonator, that is, for example, the resonator from the tip of which oil is to be atomized, be exerted through a dummy resonator which is sonically compatible with the working resonator.

Further according to this invention, it has been found that in a mechanically clamped transducer assembly of the kind described some improvement in energy transmission from the ceramic piece to the working or first resonator, and indeed to the dummy or second resonator, may result if the abutting surfaces of the several parts of the assembly be coated with a silicone polymer having rheo-restitutional properties varying significantly with the rate of strain of the material. Use of such a coating material will at least alleviate any conditions of irregularity of finish of these abutting surfaces.

Still further according to this invention, relatively large mechanical displacement outputs are obtained from a transducer in which the working resonator is in the form of a stepped cylinder rather than that of a truncated cone.

Even still further according to this invention, the efficiency of the transducer is improved by making the thickness of the ceramic piece relatively small compared to the length of the working resonator.

The nature and substance of this invention will be more clearly perceived and fully understood by referring to the following description and claims taken in connection with the accompanying drawings in which:

Figure 1:
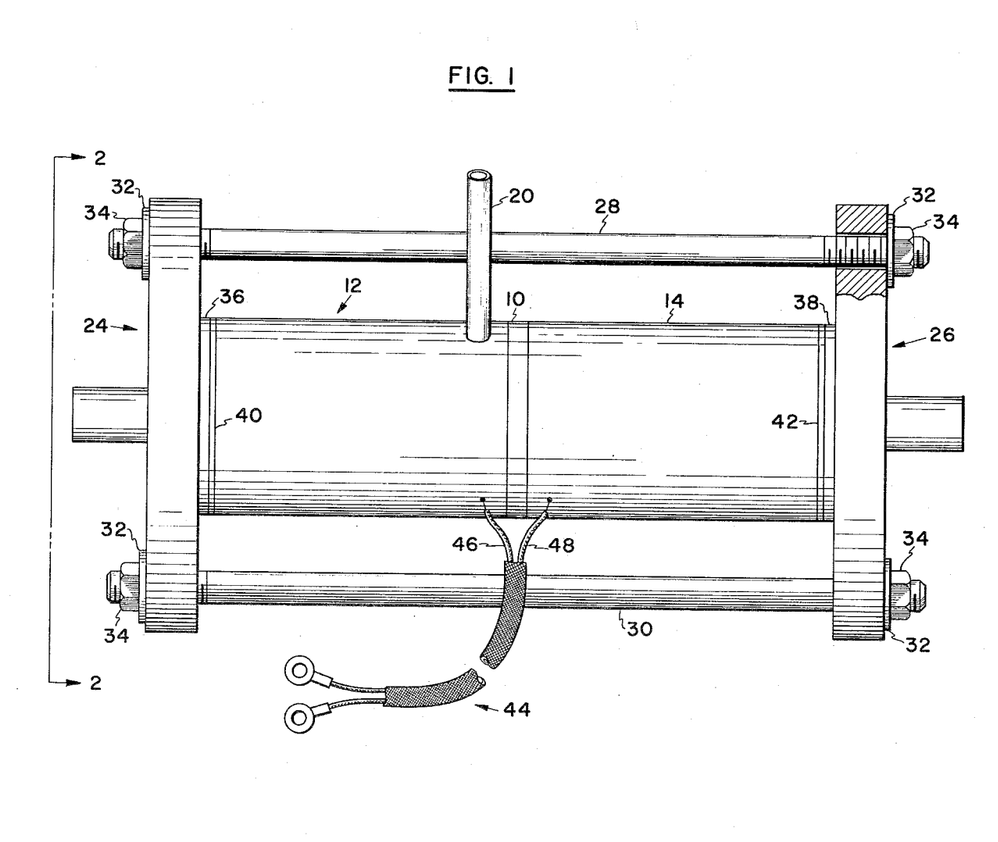
FIG. 1 represents a view in side elevation of a preferred embodiment of the transducer of this invention, with part of the clamping means whereby the piece of ceramic piezo-electric material and the resonator wherefrom atomized liquid is discharged are held in compression broken away to show details of construction.
Figure 2:
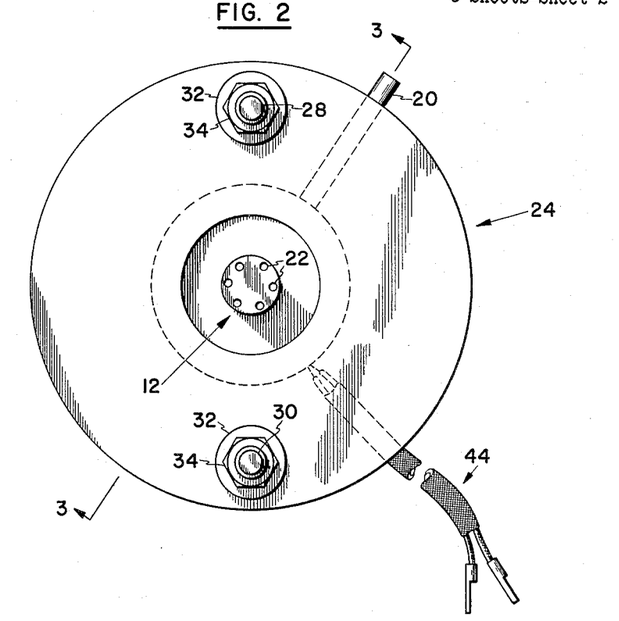
FIG. 2 represents a view in end elevation of the transducer of FIG. 1 taken along line 2—2 there according to the direction of the arrows.
Figure 3:
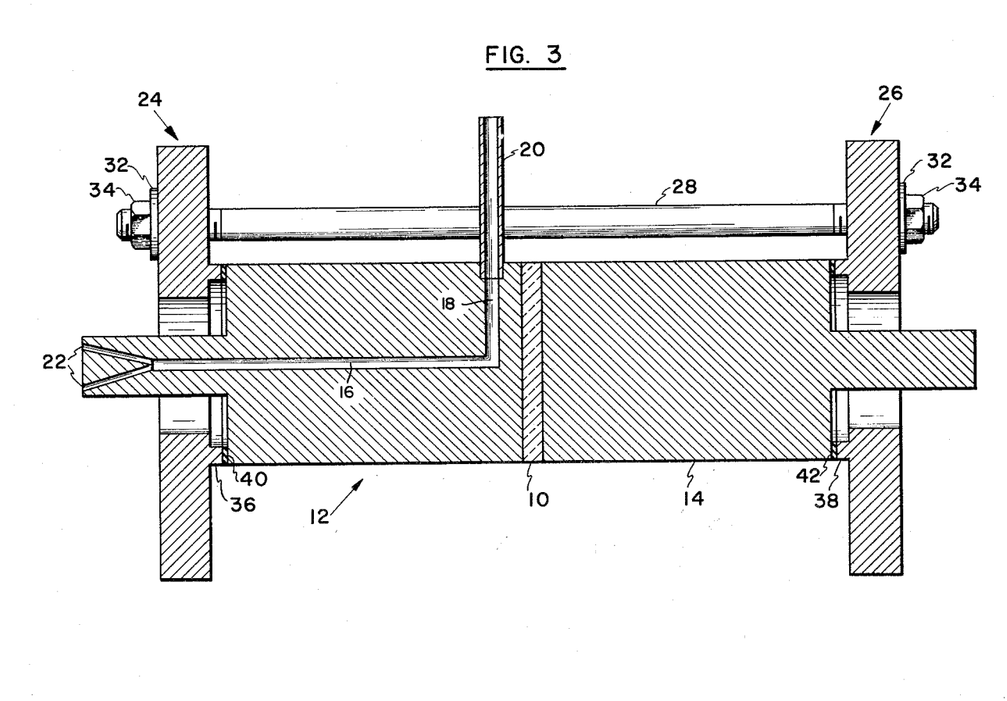
FIG. 3 represents a view in longitudinal sectional elevation of the transducer of FIG. 1 taken along line 3—3 in FIG. 2 according to the direction of the arrows.

Referring now to the drawings in detail, especially FIGS. 1, 2 and 3 thereof, a relatively thin ceramic disc 10 of piezo-electric material is disposed between the larger ends of a first resonator 12 and a generally geometrically similar second resonator 14. The particular material of disc 10 is not critical for the present invention. Use in transducers of such a piezo-electric material as the ferro-electric ceramic barium titantate has been mentioned already. Other ceramic materials suitable for this use include lead zirconates and lead zirconium titanates. With respect to the material of the first resonator 12, use of an elastic, electrically conductive material such as aluminum has likewise been mentioned already. Other materials appropriate for this resonator include brass and stainless steel. The material of second resonator 14 may be the same as that of first resonator 12, or it may be another elastic and electrically conductive material. If of a different material, second resonator 14 will be appropriately sized in respect of first resonator 12 to allow for differences in the sonic properties of the two materials. In any case, second resonator 14 will be sonically compatible with first resonator 12.

Within first resonator 12 there is an axial hole or passage 16 extending at least part way through the portion of greater diameter of this resonator. At its end nearer the end of the resonator removed from the diametrally smaller portion thereof, axial hole 16 is joined by radial hole 18 extending outwardly to the surface of the resonator. Radial hole 18 is provided at its outer end with a feed tube 20 wherethrough home heating oil or another liquid to be atomized may be introduced into first resonator 12. At its end near the free end of the diametrally smaller portion of the first resonator, axial hole 16 branches into a plurality of smaller holes 22 extending through this resonator end. Liquid fed to the transducer spreads substantially evenly from holes 22 over the free end surface of first resonator 12 and is atomized therefrom. By having a plurality of outlet holes such as 22 each of diameter smaller than that of main liquid passages 16 and 18, liquid receiving capacity of the transducer is maintained while the median size of liquid particles emanating therefrom is held small.

First resonator 12 and second resonator 14 are held in compression against opposite faces of ceramic disc 10 by means of end plates 24 and 26 and tie rods 28 and 30. Each tie rod is threaded at both its ends, and passes through clear holes in the end plates. A washer 32 and a nut 34 are applied to each end of each rod to make up the assembly.

End plates 24 and 26 are each provided with a central hole to allow clear passage therethrough and projection therebeyond of the portions of reduced diameter of first and second resonators 12 and 14 respectively. These end plates are provided further with annular bosses 36 and 38 respectively whereby actual compressive force is exerted against the first and second resonators through layers of electrical insulation 40 and 42. Only one of these layers is essential in fact, but if only a single insulating layer be used there will be a directionality requirement for electrical connection of the transducer which will not exist if both of the illustrated layers of electrical insulation are employed. These layers may be of any suitable material which besides being an electrical insulator demonstrates only low acoustic losses. Specifically, layers 40 and 42 may be cut from a sheet or sheets of a polyester film known commercialy as "Mylar" and manufactured by E. I. du Pont de Nemours Company. This film comprises essentially a highly durable, transparent polyethylene terephthalate resin, and is available in thicknesses up to about ten mils (0.01").

It is important for purposes of this invention that the pressure-exerting surfaces of end plate bosses 36 and 38 have areas which are relatively quite small in comparison with the end areas of the larger diametral or base portions of first and second resonators 12 and 14 adjacent the smaller diametral or tip portions of these resonators. It is at least convenient that the pressure-exerting surfaces of the end plates bear against the designated end areas of the two resonators across the electrical insulation only in way of the outermost or peripheral parts of these areas. Both these considerations are significant for reason of allowing substantially free flexure of the designated end areas of resonators 12 and 14 as needed for the sustaining of longitudinal vibrations through the whole of the first and second resonators.

Alternating voltage is applied to the transducer through cable 44 which comprises two individual leads 46 and 48. Lead 46 is mechanically and electrically attached to first resonator 12, while lead 48 is attached similarly to second resonator 14. To insure minimum impedance to the application of high frequency alternating voltage across the opposite faces of ceramic disc 10 through the wiring connections shown, the abutting faces of disc 10 and resonators 12 and 14 should be quite smooth, and be held one against another in at least moderate compression by action of end plates 24 and 26, tie rods 28 and 30, washers 32, and nuts 34. The faces of the ceramic disc in contact with the first and second resonators may be silvered for further reduction of electrical impedance at the interfaces of these transducer parts.

Figure 4:
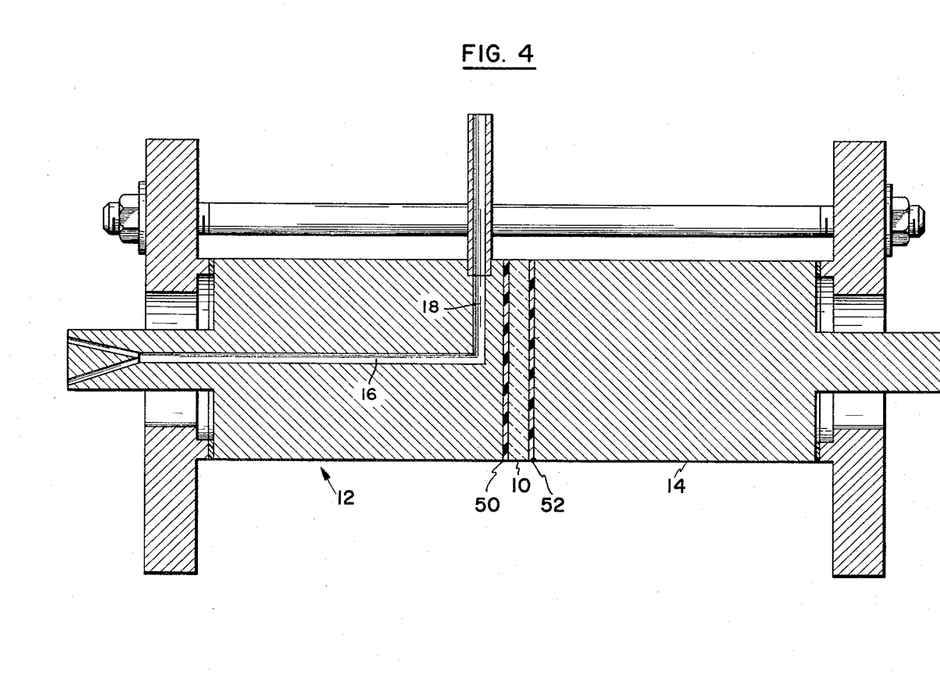
FIG. 4 represents a view in longitudinal sectional elevation of a transducer generally similar to that shown in FIG. 3, but with the particular difference that layers of coupling material are employed between abutting or adjacent faces of the piezo-electric and resonator parts of the transducer assembly.

Referring next to FIG. 4, a transducer is illustrated which is generally similar to that shown in FIG. 3, but with the particular difference that the closely adjacent, plane parallel faces of ceramic disc 10 and first and second resonators 12 and 14 are not in direct contact one with another, but are separated by thin layers 50 and 52 of a silicone polymer such as polydimethyl silicone which is commonly called "silicone bouncing putty." This polymer flows readily in substantially plastic fashion under low rates of strain, but exhibits a high coefficient of restitution as an elastic material when strained at a high rate. As silicone polymer is used for layers 50 and 52 in the transducer of this invention, it is strained at a very rapid rate. One way of actually fabricating layers 50 and 52 is to brush a suspension in acetone of a high molecular weight silicone polymer onto the plane faces of ceramic disc 10 and resonators 12 and 14; allow the acetone to evaporate before the disc and the two resonators are put together, and then assemble these elements in the arrangement shown. Polymer residues between adjacent part faces then become layers 50 and 52. Another way of fabricating the polymer layers is to use a polymer of lower molecular weight that can be spread directly on the plane surfaces of the ceramic disc and the first and second resonators, and then make up the illustrated assembly.

The silicone material of layers 50 and 52 will not only provide good initial coupling for transmission of sonic energy from ceramic disc 10 to first resonator 12, for example, even though the closely adjacent, plane parallel surfaces of these parts be not entirely smoothly finished, but also on account of its lack of any fatigue or work hardening characteristics and its self-healing ability with respect to small cracks resulting from high strains it will provide good coupling for essentially an indefinite amount of use. Polymer layers 50 and 52 will not normally offer any particular impedance to the application of high frequecy alternating voltage across the opposite faces of ceramic disc 10. To improve the electrical conductivity of the polymer material in any given case, however, this material may be mixed with the powder of a highly conductive metal such as silver, for example, before application to the plane faces of the ceramic disc and the two resonators which are to be placed in closely adjcaent relation.

Figure 5:
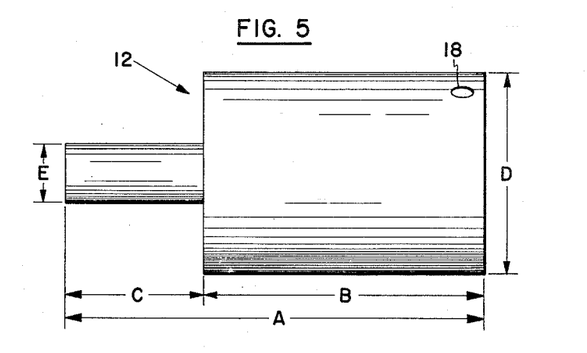
FIG. 5 represents a view in side elevation of a resonator of the kind particularly suitable for use in the transducers of FIGS. 1 and 4.

Referring next to FIG. 5, the overall length of first resonator 12 is designated A. The length of its portion of greater diameter or base portion is designated B, and that of its portion of smaller diameter or tip portion is designated C. This resonator will resonate in any mode of longitudinal vibration such that a displacement node appears substantially at its base end or end of larger diameter (actually at the centre-line plane of the driving ceramic disc 10), and a displacement anti-node or plane of maximum displacement appears at its tip end or end of smaller diameter. These boundary conditions define an infinite series of resonant frequencies, the first overtone of which corresponds to the three-quarter wave mode in which there is only one intermediate node present within the body of the resonator.

It is highly desirable to clamp the resonator at a displacement node in order to reduce to a minimum the damping effect of the clamping force on the vibration of the system. In the case of a stepped resonator, it is convenient to apply the clamping force at the periphery of the shoulder between the tip and base portions. Dimensions B and C should be chosen, therefore, to position a displacement node essentially at this shoulder. For the three-quarter wave mode, it would probably be assumed on the basis of classical physics that the desired positioning could be achieved by making B equal to 2C, no particular account being taken of the thickness of the ceramic disc. While such a dimensional proportion ($B/C=2$) is approached in resonators in which the wavelength of sound at the selected operating frequency is much larger than the base diameter D, significant divergences from the 2:1 ratio for best results are observed in the relatively short resonators which are of particular interest for purposes of the present invention. These divergences arise from departures from plane wave motion and from complex modes of vibration which tend to occur more strongly in such resonators. A method of choosing the most suitable values of B and C for at least certain actual cases is discussed subsequently.

In a preferred operational embodiment of the transducer of this invention, resonator 12 will be driven in the three-quarter wave mode. In this mode the transverse face of the first resonator abutting ceramic disc 10 will be a plane of very little, essentially zero, overall displacement, but one against which substantially maximum force is exerted. The transverse shoulder face of resonator 12 from which the tip portion of the resonator extends will likewise be a plane of essentially zero overall displacement, although it is subject to local flexing.

In contrast to these planes of zero displacement or displacement nodes, there will be a transverse plane of maximum longitudinal displacement in the middle region of the base portion of first resonator 12, that is, at the one quarter wavelength location. Likewise and very importantly, the free face of the tip region wherethrough holes 22 open will be a plane of maximum displacement, or a displacement anti-node. The displacement of the tip end of the resonator will be magnified over that of the plane of maximum displacement in the base portion substantially according to the inverse ratios of the squares of their diameters, that is, according to the ratio $D^2/E^2$ to use the given diametral designation. In the practical sense, a considerable degree of displacement magnification will be obtainable at the tip end of the resonator by reducing the diameter of the tip portion relative to that of the base portion. It will, however, be limited finally by the tip portion coming to behave primarily as a load on the base portion rather than as a longitudinally vibratory body coupled elastically thereto. Even if no stepping down of diameters be used, however, a significantly magnified displacement at the one quarter and three-quarter wavelength locations of resonator 12 will be obtained in comparison with that available at the face of ceramic disc 10 abutting this first resonator.

Actual dimensions of length of first resonator 12 will be controlled by the desired or required operating frequency of the transducer. Although each of the other dimensions of the resonator will exert a secondary effect, the resonant frequency of the resonator in any particular mode is determined mainly by the overall length A. Various factors can affect the choice of resonant frequency, some of which are generally applicable while others depend on the conditions of the particular utilization in question. For example, it is often desirable to operate a resonant system at a frequency above that at which it can produce noise. This consideration sets a lower frequency limit and hence a maximum value of length A for a particular mode.

The conditions of the particular utilization will in general define the most suitable values of diametral dimensions D and E, and also of the diameter of the ceramic disc which may or may not be made equal to D. Fixing the diameter of the disc substantially places an upper limit on the resonant frequency which may be used because it is ordinarily desirable to operate below the first radial resonant frequency of the disc, and this frequency is a function of disc diameter. The considerations so far set forth, therefore, define a frequency range within which the transducer should be designed to operate, and this in turn defines a range of acceptable values of resonator overall length A. Within this range, particular values of A, B, and C may be chosen to give maximum resonator activity for a given applied voltage. The effect of changes each in any particular dimension on the activity of the system can be determined by varying that dimension and measuring the current acceptance of the ceramic disc for the new dimensional value.

Figure 6:
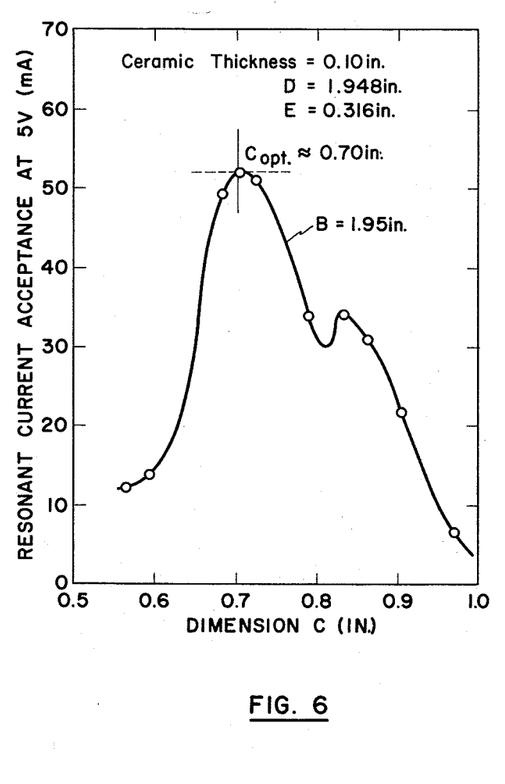
FIGS. 6 and 7 represent plots of activity characteristics for several series of stepped resonators.

Referring next to FIG. 6, the effect of varying tip length C has been studied by means of transducer assemblies using a series of aluminum resonators, each one of which had a base length B of 1.948 in., a base diameter D of 0.998 in., and a tip diameter E of 0.316 in. The ceramic disc had a thickness of 0.10 in. for each assembly. Resonant current acceptance values at an applied peak-to-peak potential of 5 volts were determined. As tip length C was increased, activity of the resonator as indicated by current acceptance increased until a maximum was reached at a tip length of about 0.70 in. Activity then fell off as C was increased further, and reached a very low value for C equal to 1 in., the tip length value corresponding to the theoretically optimum 2:1 ratio of B to C with half the thickness of the ceramic disc being added to length B measured on the resonator alone. The significance of the plot in FIG. 6 is that an optimum value of tip length C is shown to exist for the selected value of base length B. Together, of course, these two lengths make up the overall length A of the resonator.

Figure 7:
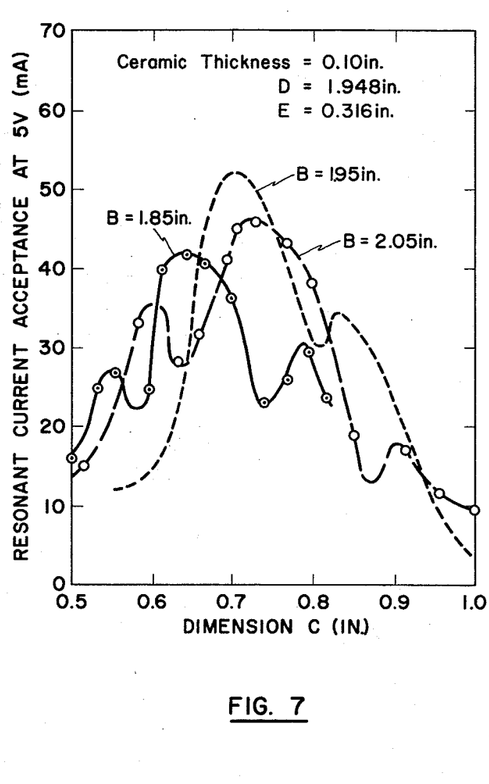

Referring next to FIG. 7, the curve of resonant current acceptance vs. tip length C from FIG. 6 (B=1.948 or 1.95 in.) is redrawn for purposes of contrast and comparison with generally similar curves developed from operation of transducers in which two series of aluminum resonators had base length B values of 1.85 in. and 2.05 in. Diametral dimensions D and E were the same for all values of base length B, as was the thickness of the ceramic disc. The curves of FIG. 7 show that the peak values of resonant current acceptance were not the same for all values of resonator base length. Said in other words, these curves show that an optimum value of base length B can be determined, at least for any particular set of values of resonator diameters. Selection of the correct value of base length B and particularly of tip length C is essential for construction of a satisfactorily efficient transducer.

Figure 8:
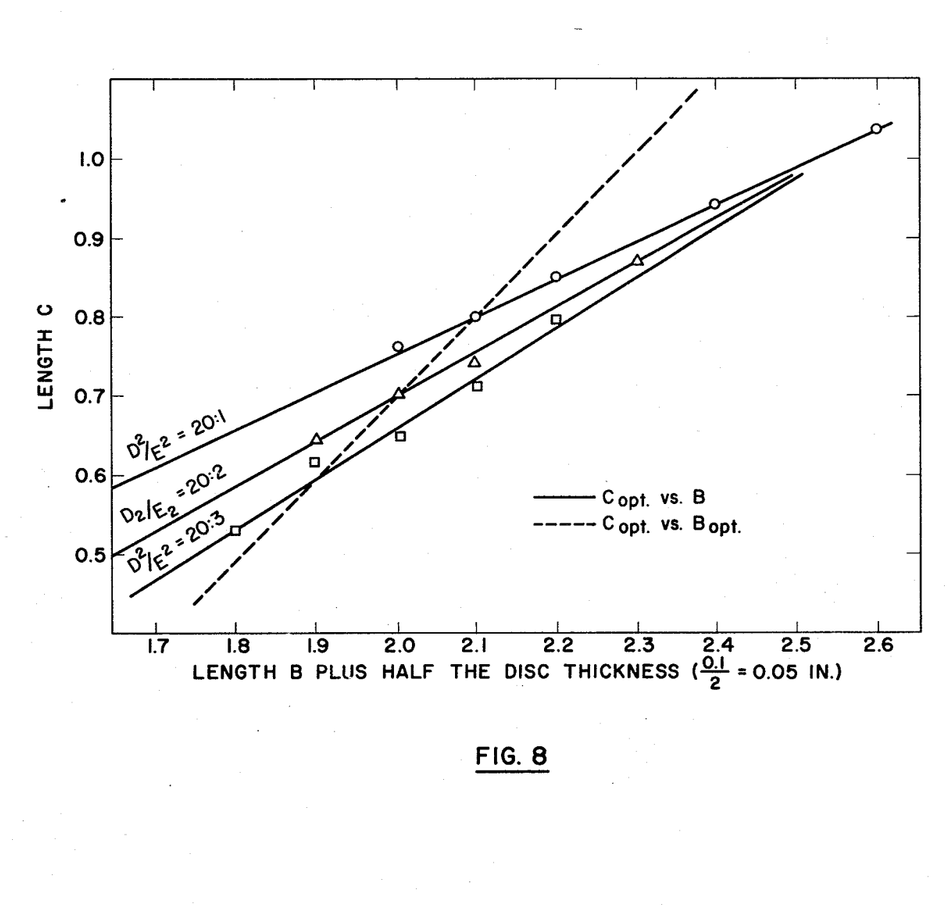
FIG. 8 represents plots of optimum dimensions for several series of stepped resonators.

Referring finally to FIG. 8, data plots of optimum tip length C vs. base length B plus half the ceramic disc thickness are given for the ratios of diameters squared ($D^2/E^2$) of 20:1, 20:2, and 20:3, all data relating to operation of transducers having aluminum resonators of base diameter D of 0.998 or 1.00 in. The ($D^2/E^2$) ratio of 20:2 or 10:1 corresponds substantially to a tip diameter E of 0.316 in. for the given value of base diameter D. As noted hereinbefore, this particular value of E obtained for all resonators in transducers wherewith and wherefrom data plotted in FIGS. 6 and 7 were gathered.

Also shown in FIG. 8, there is a line of optimum values of tip length C vs. optimum values of base length B. Points on this line, of course, extend across a range of values of the ratio ($D^2/E^2$). Data and/or data-based results plotted in FIG. 8 as well as in FIGS. 6 and 7 all relate to operations carried out with transducers constructed as shown in FIGS. 1 and 3, that is, constructed with ceramic disc 10 in direct contact with first and second resonators 12 and 14. The curves or lines of FIG. 8 may be used directly for design purposes. Outside the dimensional ranges covered by the plotted data, suitable dimensions may be determined by experimental activity measurements.

Besides actual reductions to practice of this invention in the form of transducers constructed according to FIGS. 1 and 3, an actual reduction to practice has been effected in the form of a transducer constructed according to FIG. 4, that is, a transducer including coupling layers 50 and 52 of silicone polymer material between the closely adjacent faces of ceramic disc 10 and first and second resonators 12 and 14. In this transducer first resonator 12 had the following specifications (using some designations from FIGS 1 and 3):

| | |
|---|---|
| Material | Aluminum. |
| Length A | 2.650 in. |
| Length B | 1.948 in. |
| Length C | 0.702 in. |
| B/C | 2.77. |
| Diameter D | 0.998 in. |
| Diameter E | 0.316 in. |
| $D^2/E^2$ | 9.96. |
| Diameter of axial hole 16 | 1/16 in. |
| Diameter of radial hole 18 | 1/16 in. |
| Distance from centerline of radial hole 18 to large, unstepped end of first resonator | 7/8 in. |
| Number of branch holes 22 (centers of exterior ends evenly spaced on uniform circle) | 6. |
| Diameter of each branch hole 22 | 0.032 in. |
| Diameter of circle of centers of exterior ends of branch holes 22 | 3/16 in. |

Second resonator 14 was identical to first resonator 12 except that it had no holes corresponding to holes 16, 18 and 22.

Ceramic piece 10 of piezo-electric material had the following specifications:

| | |
|---|---|
| Material | Lead zirconium titanate. |
| Diameter | 1 in. |
| Thickness | 0.10 in. |

The coupling material of layers 50 and 52 consisted essentially of polydimethyl silicone.

Annular bosses 36 and 38 of end plates 24 and 26 each had the following specifications:

| | Inch |
|---|---|
| Inside diameter | 7/8 |
| Outside diameter | 0.998 |
| Thickness in direction parallel to axis of first and second resonators | 1/16 |

The "Q" value or ratio of energy stored to energy lost per cycle was calculated for this tranducer according to the method given in the article "Methods for Measuring Piezoelectric, Elastic, and Dielectric Coefficient of Crystals and Ceramics" by W. P. Mason and H. Jaffe appearing at pp. 921–930 of Proceedings of the Institute of Radio Engineers, June 1954. According to this reference $$Q = \frac{r}{2\pi f_R C_0 R_1} \quad (1)$$

where $r$ is determined according to Eqn. 2 given hereinafter; $f_R$ is the resonant frequency of the transducer as defined hereinafter; $C_0$ is the capacitance of the ceramic piece, and $R_1$ is the equivalent resistance of the transducer at the resonant frequency.

The resonant frequency $f_R$ is defined as that at which the transducer draws the most current for a given applied voltage and wave form. The antiresonant frequency $f_A$ is defined as that at which the transducer draws the least current for the same applied voltage and wave form. According to Mason and Jaffe $$r = \frac{f_R^2}{f_A^2 - f_R^2} \quad (2)$$

Using data gathered in a dry run (no liquid feed to the transducer), a "Q" value of 859 was determined according to Eqn. 1. At resonance the power supplied to the transducer was about 2.32 watts (116 milliamperes R.M.S. at 20 volts R.M.S.), and the resonant frequency was about 58.2 kilocycles per second. For a transducer apparatus of the kind to which this invention relates a "Q" value of 859 is relatively high, and therefore quite desirable.

After a determination of "Q" was made, the aforedescribed transducer was operated in a wet or atomizing run wherein it was fed with room temperature water at a rate of about 0.4 gallon per hour. The operating frequency was about 58 kilocycles per second. Power consumption of the transducer was about 4.0 watts (132 milliamperes R.M.S. at 39 volts R.M.S. and 0.8 power factor with leading current).

For the atomized water, a mass median particle size of about 160 microns was determined according to the method given in the article "A Technique for the Investigation of Spray Characteristics of Constant Flow Nozzles," by J. H. Rupe appearing at pp. 680–694 of Third Symposium on Combustion, Flame and Explosion Phenomena, The Williams & Wilkins Co., 1949, Baltimore, Md. Essentially this method calls for atomized water to be collected in a cell filled with a material such as kerosene or Stoddard Solvent. These materials are less dense than and immiscible with water. Therefore the water particles falling into the collection cells sink to the bottom thereof while retaining their discrete identities, and may later be viewed optically or photomicrographed for counting and sizing. The foregoing described experiments show conclusively that the transducer of this invention is altogether operable and well suited for its intended purposes, particularly for that of the atomization of liquids.

It has been said hereinbefore that second resonator 14 should be sonically compatible with first resonator 12. To express it another way, the second resonator should have the characteristic of acting as an anvil to reinforce the power output of the first resonator. The primary requirement for sonic compatibility is that the first and second resonators have substantially identical resonant frequencies in the chosen mode of vibration. Within the scope of this requirement it is possible to have first and second resonators of identical or different materials (both aluminum, both brass, or one of each, for example), of identical or different shapes (both stepped cylinders, both uniform cylinders, or one of each, for example), or mixed as to both material and shape (a stepped aluminum cylinder and a uniform brass cylinder, for example).

Although this invention has been described with a certain degree of particularity, it is to be understood that the present disclosure has been made only by way of example, especially with regard to numerical quantities given herein, and that resort may be had to numerous changes in the details of construction without departing from the spirit and scope of this invention as hereinafter claimed.

What is claimed is:

1. A transducer apparatus for receiving inputs of alternating voltage and providing outputs of mechanical displacement, said apparatus comprising (1) a piece of piezoelectric material characterized by two opposite and essentially parallel faces, (2) a metallic resonator in closely spaced relation to a first one of said faces, (3) a layer of coupling material consisting of a silicon polymer between said first face of said piece of piezo-electric material and said resonator, said coupling material flowing readily in substantially plastic fashion under low rates of strain, but exhibiting a high coefficient of restitution as an elastic material when strained at a high rate, and (4) mechanical clamping means engaged with said piece of piezo-electric material and said resonator whereby said piece of piezoelectric material and said resonator are held in compression one against the other across said layer of coupling material.

2. A transducer apparatus according to claim 1 in which said metallic resonator is configured as a stepped cylinder, and has its end of larger diameter abutting said first face of said piece of piezo-electric material across said layer of coupling material.

3. A transducer apparatus according to claim 2 in which said stepped cylinder comprises a portion of larger diameter and a portion of smaller diameter, the length of said portion of larger diameter being more than twice that of said portion of smaller diameter.

4. A transducer apparatus according to claim 1 in which said silicone polymer consists essentially of polydimethyl silicone.

5. A transducer apparatus according to claim 1 in which said mechanical clamping means in its engagement with said resonator bears against only a small, peripheral area of said resonator.

6. A transducer apparatus for receiving inputs of alternating voltage and providing outputs of mechanical displacement comprising:
   a piece of piezo-electric material characterized by two opposite and essentially parallel faces;
   a first metallic resonator configured as a stepped cylinder and which has its end of larger diameter in close relation to the first face of said piece of piezo-electric material;
   a second metallic resonator configured as a stepped cylinder and which has its end of larger diameter in close relation to the second face of said piece of piezo-electric material;
   clamping means engaging said first and second resonators whereby said resonators exert compressive force upon said piece of piezo-electric material, said clamping means engaging each of said resonators at the periphery of the shoulder between the portion of larger diameter and the other portion of the stepped cylinder, said resonators being designed so that each of said shoulders is a surface of essentially zero displacement.

7. A transducer apparatus according to claim 6 which is characterized by a main axial hole extending at least part way through said first metallic resonator, and which is characterized further by means wherethrough liquid to be atomized may be fed to said main axial hole.

8. A transducer apparatus according to claim 7 in which said main axial hole branches at one of its ends into a plurality of holes, each of diameter less than that of said main axial hole.

References Cited in the file of this patent

UNITED STATES PATENTS

| | | |
|---|---|---|
| 2,855,244 | Camp | Oct. 7, 1958 |
| 2,895,061 | Porbus | July 14, 1959 |
| 2,908,443 | Fruengel | Oct. 13, 1959 |
| 2,947,886 | McGuingle | Aug. 2, 1960 |
| 2,947,889 | Rich | Aug. 2, 1960 |

OTHER REFERENCES

Rochow: "Chemistry of the Silicones," Second Edition, copyright 1951, John Wiley and Sons, Inc., New York (page 97).